United States Patent
Sato et al.

(10) Patent No.: US 10,512,985 B2
(45) Date of Patent: Dec. 24, 2019

(54) JOINT PROCESSING METHOD AND DOME MEMBER

(71) Applicant: MITSUBISHI HEAVY INDUSTRIES, LTD., Tokyo (JP)

(72) Inventors: Hiroaki Sato, Tokyo (JP); Hiroki Akamatsu, Tokyo (JP); Toshiaki Endo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 356 days.

(21) Appl. No.: 15/328,662

(22) PCT Filed: Sep. 1, 2015

(86) PCT No.: PCT/JP2015/074846
§ 371 (c)(1),
(2) Date: Jan. 24, 2017

(87) PCT Pub. No.: WO2016/047394
PCT Pub. Date: Mar. 31, 2016

(65) Prior Publication Data
US 2017/0209957 A1 Jul. 27, 2017

(30) Foreign Application Priority Data
Sep. 24, 2014 (JP) .................. 2014-194396

(51) Int. Cl.
*B23K 20/12* (2006.01)
*C22F 1/04* (2006.01)
(Continued)

(52) U.S. Cl.
CPC .......... *B23K 20/1275* (2013.01); *B21D 22/14* (2013.01); *B23K 20/2336* (2013.01);
(Continued)

(58) Field of Classification Search
CPC ............ B23K 20/1275; B23K 20/2336; B23K 20/122; B23K 2103/10; B23K 2101/04;
(Continued)

(56) References Cited

U.S. PATENT DOCUMENTS 3,024,938 A * 3/1962 Watter .................. B21D 51/24
220/4.12
5,098,490 A * 3/1992 Huu ........................ C22F 1/047
148/415
(Continued)

FOREIGN PATENT DOCUMENTS

JP 11-28582 2/1999
JP 2002-263865 9/2002
(Continued)

OTHER PUBLICATIONS

Machine translation of JP2003-236635A (no date available).*
(Continued)

*Primary Examiner* — Kiley S Stoner
(74) *Attorney, Agent, or Firm* — Wenderoth, Lind & Ponack, L.L.P.

(57) ABSTRACT

A joint processing method includes: a friction stir welding step for forming a joint in a plate by friction stir welding a groove in the plate; a cold working step for cold working the joint under cold working conditions such that a grain size in the joint is not more than a grain size of an aluminum alloy in the groove prior to the friction stir welding step; and a solution heat treatment step for, subsequent to the cold working step, performing solution heat treatment of the plate.

14 Claims, 9 Drawing Sheets

(51) Int. Cl.
  *B21D 22/14* (2006.01)
  *B23K 20/233* (2006.01)
  *F16B 5/08* (2006.01)
  *B23K 103/10* (2006.01)
(52) U.S. Cl.
  CPC .............. *C22F 1/04* (2013.01); *F16B 5/08* (2013.01); *B23K 2103/10* (2018.08)
(58) Field of Classification Search
  CPC .......... B23K 2101/12; F16B 5/08; C22F 1/04; B21D 22/14
  USPC ............... 228/2.1, 112.1, 184, 141.1–163
  See application file for complete search history.

(56) References Cited

U.S. PATENT DOCUMENTS

| | | | | |
|---|---|---|---|---|
| 5,152,452 | A * | 10/1992 | Fendel | B21D 51/24 220/581 |
| 5,460,317 | A | 10/1995 | Thomas et al. | |
| 5,697,511 | A * | 12/1997 | Bampton | B23K 20/1265 220/4.12 |
| 6,258,463 | B1 * | 7/2001 | Corridan | C22F 1/04 148/270 |
| 7,971,740 | B2 * | 7/2011 | Shimada | F17C 1/00 220/23.83 |
| 2004/0134971 | A1 * | 7/2004 | Narita | B23K 20/122 228/112.1 |
| 2005/0011932 | A1 * | 1/2005 | Ehrstrom | B23K 20/122 228/112.1 |
| 2006/0260376 | A1 * | 11/2006 | Osame | B21C 23/085 72/269 |
| 2007/0158343 | A1 * | 7/2007 | Shimada | F17C 1/06 220/4.14 |
| 2008/0274383 | A1 * | 11/2008 | Kanno | B23K 20/123 429/412 |
| 2008/0277036 | A1 | 11/2008 | Johansen | |
| 2009/0127271 | A1 * | 5/2009 | Muraoka | B21J 5/02 220/586 |
| 2009/0188109 | A1 * | 7/2009 | Bampton | B23K 20/1225 29/890.01 |
| 2010/0288400 | A1 * | 11/2010 | Bordesoules | B23K 20/122 148/535 |
| 2010/0310897 | A1 * | 12/2010 | Takaki | B62D 29/007 428/586 |
| 2011/0052932 | A1 * | 3/2011 | Pandey | B22F 3/1216 428/598 |
| 2012/0031249 | A1 * | 2/2012 | Morisada | B26D 1/0006 83/651 |
| 2012/0090738 | A1 | 4/2012 | Hales et al. | |
| 2016/0167161 | A1 * | 6/2016 | Sato | B23K 20/1255 228/114.5 |
| 2016/0290564 | A1 * | 10/2016 | Croteau | F17C 1/14 |
| 2017/0157720 | A1 * | 6/2017 | Sato | B23K 20/12 |
| 2017/0299122 | A1 * | 10/2017 | Croteau | F17C 1/14 |
| 2017/0343160 | A1 * | 11/2017 | Garosshen | F17C 1/14 |
| 2019/0111514 | A1 * | 4/2019 | Matsushita | B23K 20/122 |

FOREIGN PATENT DOCUMENTS

| | | | |
|---|---|---|---|
| JP | 2003-181576 | 7/2003 | |
| JP | 2003-236635 | 8/2003 | |
| JP | 2007-190606 | 8/2007 | |
| JP | 2008-279509 | 11/2008 | |
| JP | 2009-18348 | 1/2009 | |
| JP | 4838388 B2 * | 12/2011 | ......... B23K 20/1255 |
| JP | 2014-155963 | 8/2014 | |
| WO | WO-2012029176 A1 * | 3/2012 | ......... B23K 20/122 |
| WO | 2014/097631 | 6/2014 | |

OTHER PUBLICATIONS

Office Action dated Jan. 25, 2019 in corresponding European Patent Application No. 15845443.9.
Written Opinion of the International Searching Authority dated Dec. 8, 2015 in corresponding International Application No. PCT/JP2015/074846.
Extended European Search Report dated Jul. 20, 2017 in corresponding European Patent Application No. 15845443.9.
International Search Report dated Dec. 8, 2015 in corresponding International Application No. PCT/JP2015/074846.

* cited by examiner

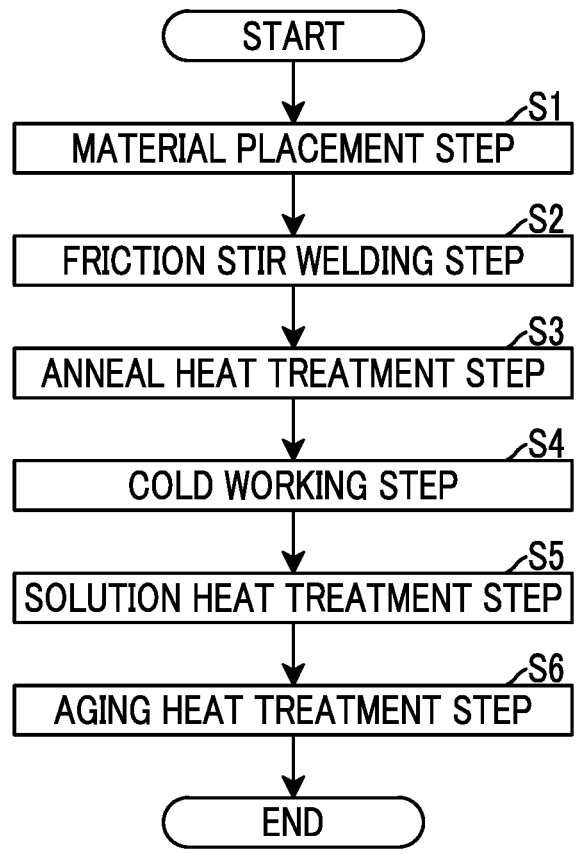
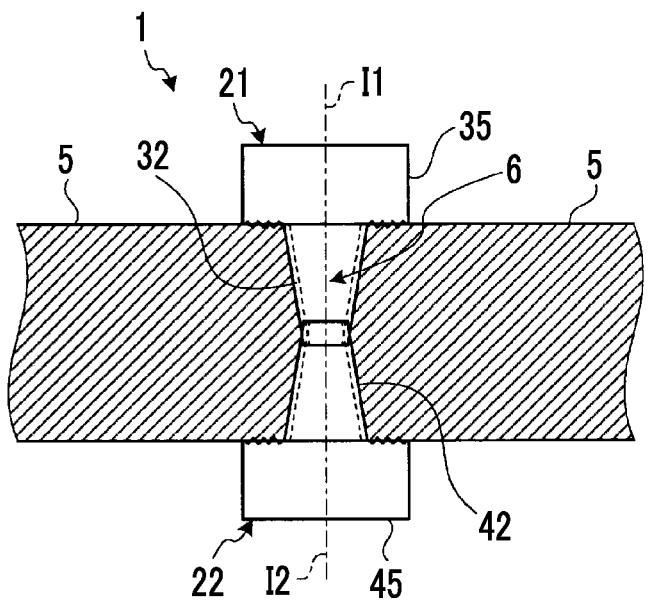

| ANNEALING TEMPERATURE | ENLARGEMENT |
|---|---|
| 413°C(P1) | YES |
| 393°C(P2) | SLIGHT DECREASE |
| 373°C(P3) | NO |
| 353°C(P4) | NO |

FIG. 7
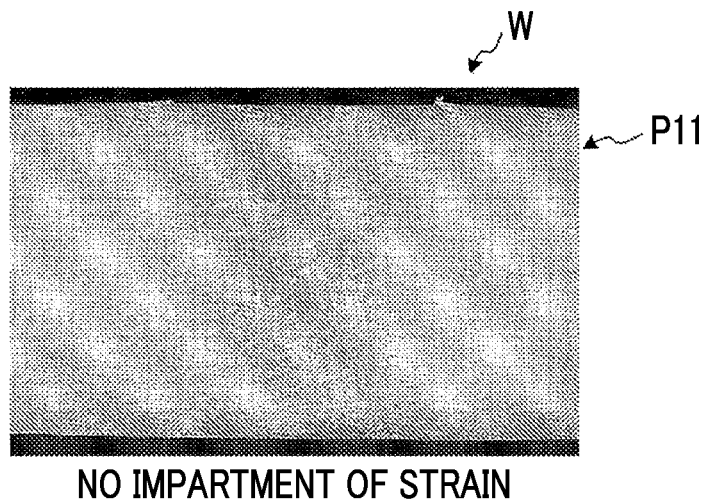
NO IMPARTMENT OF STRAIN
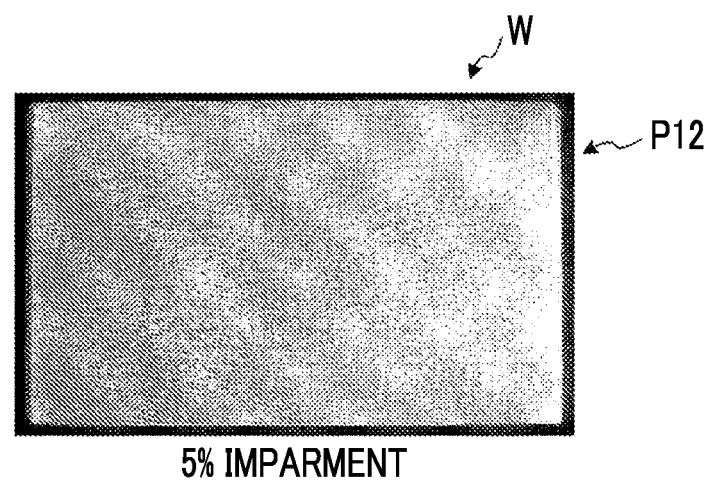
5% IMPARMENT
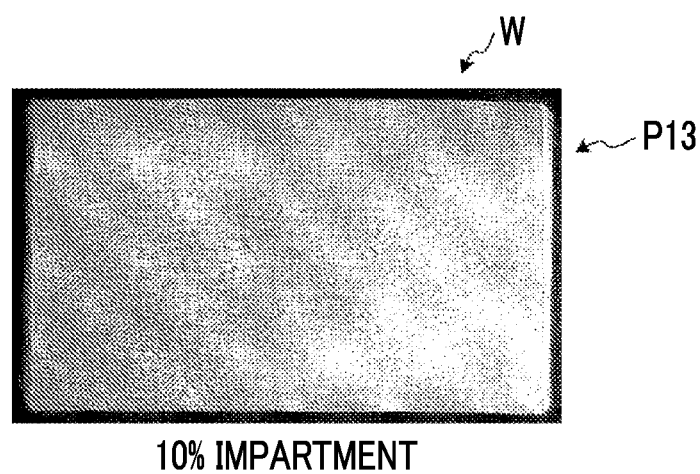
10% IMPARTMENT

JOINT PROCESSING METHOD AND DOME MEMBER

TECHNICAL FIELD

The present invention relates to a joint processing method and a dome member that perform processing on a joint formed by friction stir welding.

BACKGROUND ART

In the related art, a method of welding two or more plates by friction stir welding to form a workpiece and rotating the workpiece to form a dome having a semispherical body shape is known (for example, refer to Japanese Unexamined Patent Application Publication No. 2003-181576). In this method, before the friction stir welding is performed, a material, such as an aluminum scandium alloy, which delays growth of grains, is disposed between abutting edges between the plates.

Additionally, as a method of suppressing abnormal growth of grains accompanying solution heat treatment in a friction stir joint of an aluminum alloy, a method of performing intermediate anneal heat treatment after friction stir welding and performing solution heat treatment after the intermediate anneal heat treatment is known (for example, refer to Specification of U.S. Patent Application Publication No. 2012/0090738).

Technical Problem

Here, if the grains of the joint formed by the friction stir welding are enlarged, ductility or fracture toughness in the joint deteriorates. Accordingly, quality, such as workability or strength properties in the joint, deteriorates. In addition, enlarging the grains means that the grain size of the grains becomes larger than the grain size of metal before welding. If cold working is performed in the state of solution heat treatment to be performed in order to enhance the strength of the metal material when the quality of the joint of the metal material deteriorates, influence of cracking resulting from working or the like in the joint become apt to occur. For this reason, it is difficult that the metal material in which the joint is formed by the friction stir welding becomes a high-strength metal material by performing the cold working in the state of solution heat treatment.

In the invention related to Japanese Unexamined Patent Application Publication No. 2003-181576, an aluminum scandium alloy is added in order to prevent the enlargement of the grains. In this case, since the material composition of the joint changes, it becomes difficult to satisfy material specifications that are defined in advance. Additionally, since scandium is an expensive material, working costs related to the friction stir welding increase.

Additionally, in the invention related to Specification of U.S. Patent Application Publication No. 2012/0090738, the strain given during the friction stir welding is removed by performing anneal heat treatment of the aluminum alloy in order to prevent the enlargement of the grains. In this case, if the anneal heat treatment is performed for the purpose of the removal of the strain, only specific grains grow and are enlarged in a portion of the joint of the metal material, depending on welding conditions or solution heat treatment conditions. Additionally, if the solution heat treatment is performed in this state, the specific grains become apt to grow easily in a wider range. Therefore, it is difficult to suppress the enlargement of the grains.

Summary of Invention

Thus, an object of the invention is to provide a joint processing method and a dome member that can suppress enlargement of grains accompanying solution heat treatment of a joint formed by friction stir welding.

Solution to Problem

A joint processing method of the invention includes a friction stir welding step of forming a joint in a metal material by performing friction stir welding on a part to be welded, of the metal material; a cold working step of performing cold working on the joint under cold working conditions such that the grain size of the joint is equal to or smaller than the grain size of metal in the part to be welded before the friction stir welding step; and a solution heat treatment step of performing solution heat treatment of the metal material after the cold working step.

According to this configuration, nucleation sites for recrystallization can be increased in the joint by performing the cold working step on the joint of the metal material formed in the friction stir welding step before the solution heat treatment. For this reason, if the solution heat treatment step is performed after the cold working step, the growths of the nucleation sites for recrystallization can be suppressed each other by an amount equivalent to an increase in the nucleation sites for recrystallization. Therefore, the enlargement of the grains of the joint can be suppressed, and the grains of the joint can be made fine. Here, making the grains fine means that the grain size of the grains becomes smaller than the grain size in the part to be welded or a base material part before the friction stir welding step. In this way, a decrease in the quality of the joint can be suppressed by suppressing the enlargement during the solution heat treatment to make the grains of the joint fine. Therefore, for example, even in a case where the cold working is performed in a solution heat-treated state in order to enhance the strength of the metal material, it is possible to obtains quality capable of withstanding the working.

Additionally, it is preferable that the cold working conditions are conditions such that the strain amount of the joint before and after the cold working step becomes equal to or more than 5%.

According to this configuration, the grain size of the joint can be made smaller than the grain size in the part to be welded before the friction stir welding step by performing the cold working on the joint such that the strain amount of the joint becomes equal to or more than 5% before and after the cold working step.

Additionally, it is preferable to further include an anneal heat treatment step of performing anneal heat treatment on the metal material including the joint after the friction stir welding step and before the cold working step.

According to this configuration, the anneal heat treatment step is performed, so that the hardness in the joint of the metal material can be made uniform, and in the cold working step, the local deformation of the metal material can be suppressed, and strain can be uniformly imparted.

Additionally, it is preferable that the friction stir temperature of the joint in the friction stir welding step is made higher than the annealing temperature of the joint in the anneal heat treatment step.

According to this configuration, the friction stir temperature can be made high and the annealing temperature can be made low. Accordingly, in the anneal heat treatment step, the enlargement of the grains in the joint can be suppressed. In addition, in a case where the friction stir temperature is made higher than the annealing temperature, the friction stir temperature may be made high during the friction stir welding, the annealing temperature may be made low during the anneal heat treatment step, or both may be performed. The invention is not particularly limited.

Additionally, it is preferable that, in the friction stir welding step, friction stir welding is performed from both sides in a thickness direction of the part to be welded such that a first stirring region formed on one side in the thickness direction of the part to be welded and a second stirring region formed on the other side in the thickness direction of the part to be welded overlap each other.

According to this configuration, since the friction stirring can be performed over the entire region in the thickness direction of the joint, heat input to the joint resulting from the friction stirring can be performed over the entire region in the thickness direction.

Additionally, it is preferable that, in the friction stir welding step, a heating source that heats the part to be welded is provided opposite to a welding tool in the thickness direction of the part to be welded.

According to this configuration, in the friction stir welding step, the friction stir temperature of the joint can be made high by heating the joint with the heating source. For this reason, in a case where the anneal heat treatment step is performed, the annealing temperature can be set to be high. Therefore, the annealing time can be shortened, and working efficiency can be enhanced.

Additionally, it is preferable to further include an aging heat treatment step of performing aging heat treatment on the metal material including the joint after the solution heat treatment step.

According to this configuration, the hardness of the metal material can be enhanced by performing the aging heat treatment on the metal material. Hence, in a case where an aluminum alloy is applied as the metal material, T6 having the quality of the aluminum alloy defined by Japanese Industrial Standard (JIS) can be obtained.

Additionally, it is preferable to further include a strain imparting step of performing cold working for improving the strength of the metal material on the metal material including the joint, after the solution heat treatment step, and an aging heat treatment step of performing aging heat treatment on the metal material including the joint after the strain imparting step.

According to this configuration, the hardness of the metal material can be further enhanced by imparting strain to the metal material and performing the aging heat treatment on the metal material. This is because, since the grains in the joint after the solution heat treatment are not enlarged, and are made fine equal to or more than that of a base material, the joint has quality capable of withstanding the cold working even in a case where impartment of strain is performed. Hence, in a case where an aluminum alloy is applied as the metal material, T8 having the quality of the aluminum alloy defined by Japanese Industrial Standard (JIS) can be obtained. In addition, the strain imparting step is performed in a cold state.

Additionally, it is preferable, that the metal material in which the joint is formed in the friction stir welding step is a plate material having a plate shape, and in the cold working step, rotational cold working is performed on the plate material so as to provide a dome shape that curves from the center of the plate material toward an outside thereof.

According to this configuration, the enlargement of the structure during the solution heat treatment is suppressed by performing the rotational cold working on the plate material. Therefore, the plate material can be worked in a dome shape while increasing nucleation sites for recrystallization.

Additionally, it is preferable that, in the cold working step, a strain amount such that the thickness of the plate material becomes small is given from the center of the plate material toward the outside thereof, and the joint formed in the plate material is formed in a region where the strain amount in the cold working step becomes equal to or more than 5%.

According to this configuration, since strain can be given to the joint of the plate material even in a case where the plate material is worked in a dome shape by the rotational cold working, the enlargement of the structure during the solution heat treatment in the joint can be suppressed.

Additionally, it is preferable that the thickness of the metal material in the joint is made to be greater than the thickness in parts of the metal material other than the joint, and, in the cold working step, cold working is performed such that the thickness of the joint become smaller than the thickness of the joint formed in the friction stir welding step.

According to this configuration, in the cold working step, the cold working is performed such that the thickness of the joint become small. Accordingly, the thickness of the joint and the thickness of regions other than the joint can be made to be the same thickness while suppressing the enlargement of the structure during the solution heat treatment in the joint.

Additionally, it is preferable that the metal material is an aluminum alloy.

According to this configuration, since the aluminum alloy can be applied as the metal material, a decrease in the quality of the joint formed in the aluminum alloy by the friction stir welding can be suppressed.

Additionally, it is preferable that the cold working step is performed in a cold state.

According to this configuration, the cold working to the joint can be appropriately performed. That is, the strain amount to be given to the joint by the cold working can be appropriately controlled. Additionally, in a case where temperature is equal to or lower than 100° C., a recovery phenomenon or the like does not occur. Therefore, a phenomenon in which the strain put in during the cold working is got rid out during working also does not occur, and the amount of the nucleation sites for recrystallization for suppressing the enlargement can also be controlled.

A dome member of the invention is a dome member formed in a dome shape by performing rotational cold working on a plate-shaped metal material in which a joint is formed by friction stir welding. The metal material is formed in a dome shape that curves from the center of the plate material toward the outside thereof while a strain amount such that the thickness of the metal material becomes small is given from the center toward the outside, during the rotational cold working. The joint formed in the metal material is formed in a region where the strain amount given during the rotational cold working becomes equal to or more than 5%.

According to this configuration, the rotational cold working is performed on the plate-shaped metal material, so that the plate material can be processed in a dome shape while increasing nucleation sites for recrystallization in the joint, and the enlargement of the structure during the solution heat treatment can be suppressed.

BRIEF DESCRIPTION OF DRAWINGS

FIG. 1 is a flowchart regarding a joint processing method related to Embodiment 1.

FIG. 2 is a sectional view illustrating an example of a friction stir welding device used in a friction stir welding step.

FIG. 7 is a view illustrating an example of a joint obtained by performing the cold working step.

DESCRIPTION OF EMBODIMENTS

Hereinafter, embodiments related to the invention will be described in detail with reference to the drawings.

In addition, the invention is not limited by these embodiments. Additionally, constituent elements in the following embodiments include elements capable of being easily substituted by a person skilled in the art, or the same elements. Moreover, constituent elements described hereinbelow can be appropriately combined, and in a case where there are a plurality of embodiments, it is also possible to combine the respective embodiments.

Embodiment 1

Figures 3, 4:
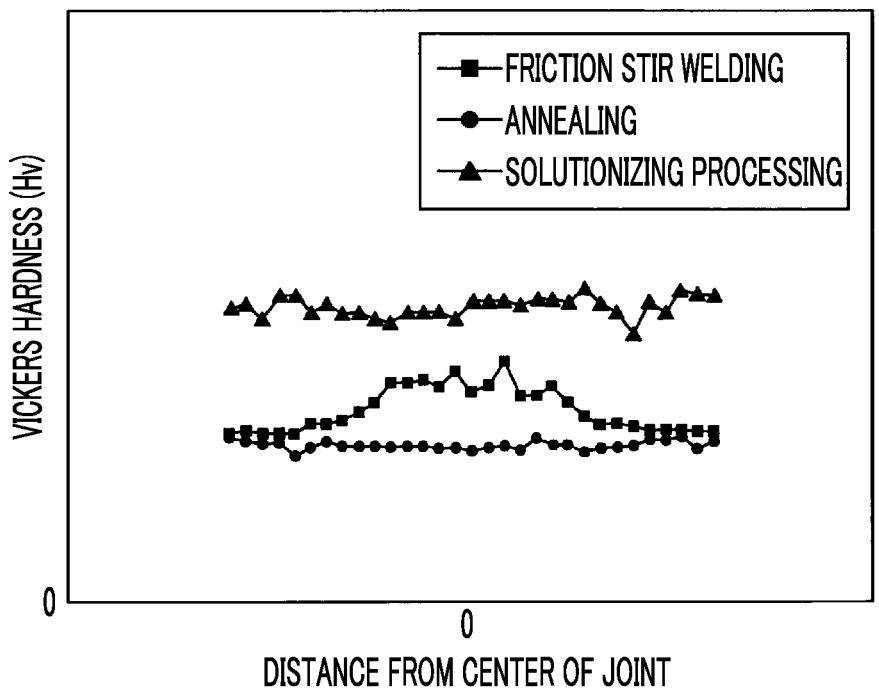
FIG. 3 is a graph regarding a joint of which the Vickers hardness varies through an anneal heat treatment step.
FIG. 4 is a table regarding grains that vary in the joint through the anneal heat treatment step.
Figure 5:
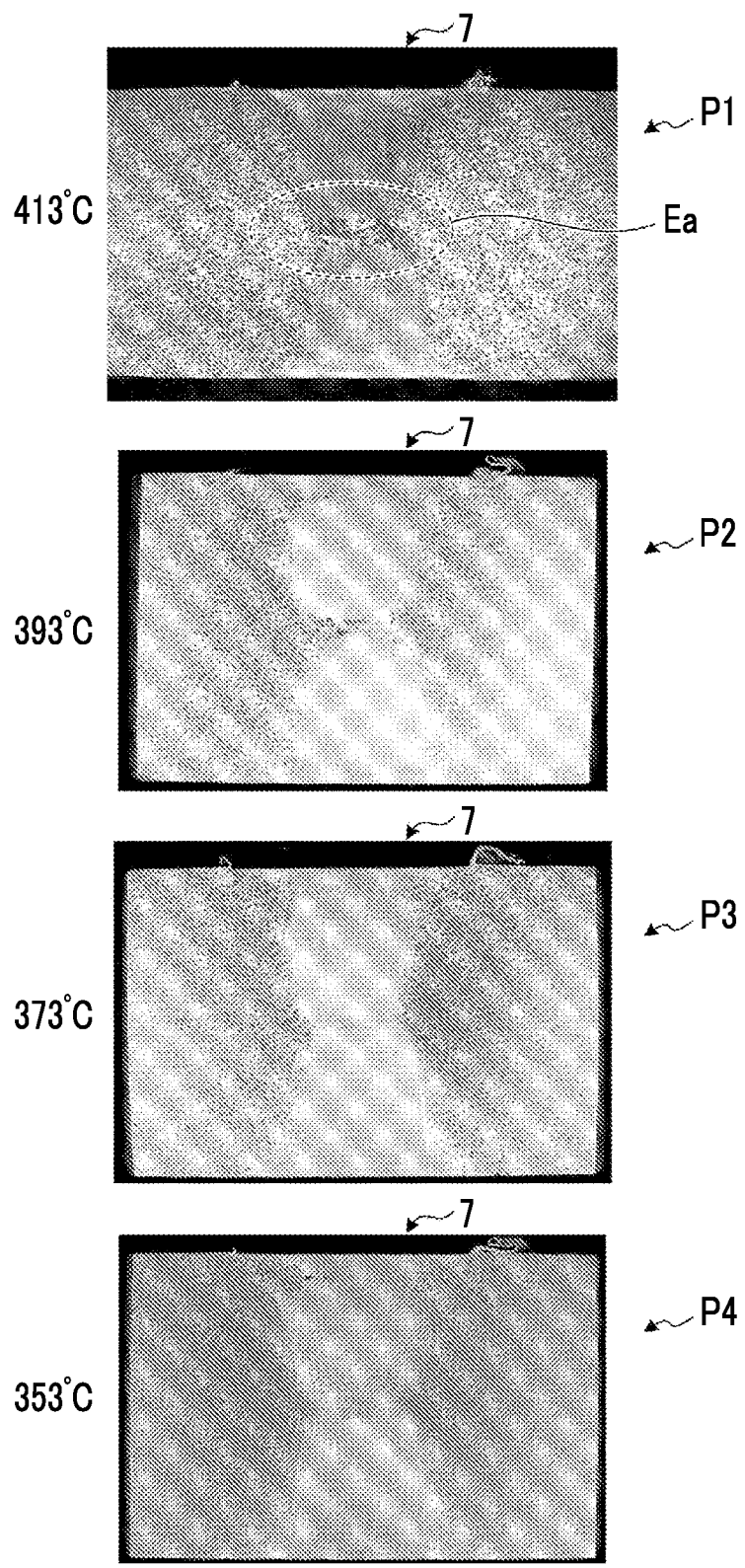
FIG. 5 is a view illustrating an example of the joint corresponding to the table of FIG. 4.
Figure 6:
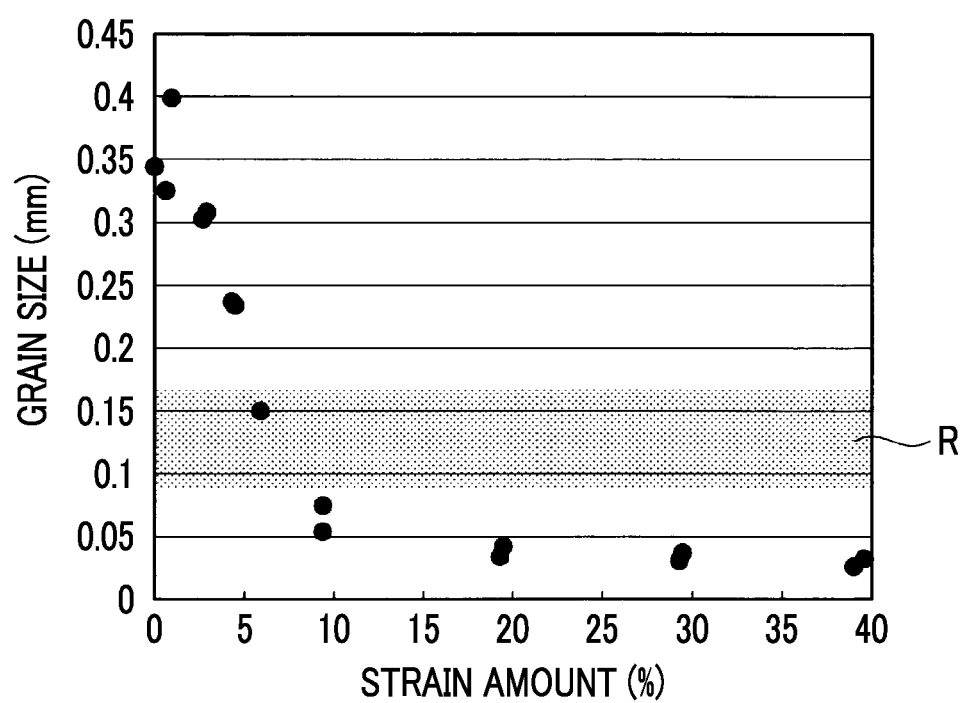
FIG. 6 is a graph of grain size that varies depending on strain amount given in a cold working step.

FIG. 1 is a flowchart regarding a joint processing method related to Embodiment 1. FIG. 2 is a sectional view illustrating an example of a friction stir welding device used in a friction stir welding step. FIG. 3 is a graph regarding a joint of which the Vickers hardness varies through an anneal heat treatment step. FIG. 4 is a table regarding grains that vary in the joint through the anneal heat treatment step. FIG. 5 is a view illustrating an example of the joint corresponding to the table of FIG. 4. FIG. 6 is a graph of grain size that varies depending on strain amount given in a cold working step. FIG. 7 is a view illustrating an example of a joint obtained by performing the cold working step.

The joint processing method of Embodiment 1 is processing performed in order to improve the quality of a joint formed by friction stir welding. As illustrated in FIG. 1, the joint processing method performs a material placement step S1, a friction stir welding step S2, an anneal heat treatment step S3, a cold working step S4, a solution heat treatment step S5, and an aging heat treatment step S6 in order.

In the material placement step S1, a plate in which an aluminum alloy is used and configured as a metal material is applied. In the material placement step S1, plates are placed such that a groove (a part to be welded) is formed by butting end surfaces of the plates against each other. In addition, in Embodiment 1, the groove obtained by butting the end surfaces of the plates against each other is used as the part to be welded that is a target for friction stir welding. However, the invention is not particularly limited to this configuration, and arbitrary regions that become the target for friction stir welding may be adopted.

In the friction stir welding step S2, a joint is formed by performing the friction stir welding (FSW) on the groove formed in the material placement step S1, and accordingly the butted plates are welded together. In this friction stir welding step S2, a friction stir welding device 1 is used, and perform the friction stir welding from both sides across the groove.

As illustrated in FIG. 2, the friction stir welding device 1 has a first rotation tool 21 and a second rotation tool 22 as welding tools. The first rotation tool 21 is disposed on an upper side (one side) in the thickness direction of the groove 6 across the groove 6. The first rotation tool 21 rotates about a first rotating axis I1, and is pressed against an upper surface of the groove 6. The second rotation tool 22 is disposed on a lower side (the other side) in the thickness direction of the groove 6 across the groove 6. The second rotation tool 22 rotates about a second rotating axis I2, and is pressed against a lower surface of the groove 6.

The first rotation tool 21 is configured to include a first probe 32 and a first shoulder part 35. The first probe 32 is formed so as to become longer than half of the thickness of the groove 6. Additionally, a notch for stirring the metal of the softened groove 6 is formed in an outer peripheral surface of the first probe 32. The first shoulder part 35 is in contact with the upper surface of the groove 6. Such a first rotation tool 21 rotates the first shoulder part 35 in a state where the first shoulder part 35 is made to be in contact with the upper surface of the groove 6, thereby giving heat resulting from friction to the groove 6, and gives the heat, thereby stirring the softened groove 6 with the first probe 32. Hence, a first stirring region subjected to the friction stirring by the first rotation tool 21 is formed on the upper side of the groove 6.

The second rotation tool 22 is configured to include a second probe 42 and a second shoulder part 45. In addition, since the second probe 42 and the second shoulder part 45 are almost the same as those of the first rotation tool 21, the description thereof will be omitted. Such a second rotation tool 22 rotates the second shoulder part 45 in a state where the second shoulder part 45 is made to be in contact with the lower surface of the groove 6, thereby giving heat resulting from friction to the groove 6, and gives the heat, thereby stirring the softened groove 6 with the second probe 42. Hence, a second stirring region subjected to the friction stirring by the second rotation tool 22 is formed on the lower side of the groove 6.

Also, since the first probe 32 is longer than half of the thickness of the groove 6, the first stirring region is a region that becomes longer than half of the thickness of the groove 6 from the upper surface of the groove 6. Similarly, since the second probe 42 is longer than half of the thickness of the groove 6, the second stirring region is a region that becomes longer than half of the thickness of the groove 6 from the lower surface of the groove 6. For this reason, the first stirring region and the second stirring region are regions that overlap each other in the thickness direction of the groove 6. Specifically, a region on the lower side of the first stirring region and a region on the upper side of the second stirring region are overlapping regions that overlap each other at the center of the groove 6 in its thickness direction. In addition, the first rotation tool 21 and the second rotation tool 22 are disposed in an offset manner so as not to interfere with each other physically, and simultaneously perform welding from both sides of the groove 6. By simultaneously welding both sides of the groove 6, it is possible to raise a minimum heating temperature during welding. In addition, welding may be performed by the second rotation tool 22 after welding is performed by the first rotation tool 21, without simultaneously performing both sides of the groove 6.

In this way, since the groove 6 is stirred over the entire region thereof in a thickness direction, heat can be given from both surfaces of the groove 6 to the center of the groove 6 in a thickness direction in the friction stir welding step S2. Here, in the friction stir welding step S2, the friction stir temperature of the joint during the friction stir welding is a temperature between 400° C. to 550° C. in, for example, an 2219 aluminum alloy.

In the anneal heat treatment step S3, a plate 5 including the joint formed in the friction stir welding step S2 is annealed at a predetermined annealing temperature. This anneal heat treatment step S3 is performed in order to make the hardness of the plate 5 uniform after the friction stir welding. Specifically, on the graph illustrated in FIG. 3, a horizontal axis represents a distance from a center (0) of the welding width of the joint, and a vertical axis represents Vickers hardness (Hv). As illustrated in FIG. 3, in the joint after the friction stir welding, the hardness is high in the vicinity of the center of the welding width, the hardness is low toward the outside of the welding width. Thus, the hardness is not uniform. Meanwhile, as illustrated in FIG. 3, since the joint after the anneal heat treatment has almost the same hardness throughout the entire region in the welding width, the hardness becomes uniform. In this way, in the anneal heat treatment step S3, the hardness of the joint uniform is made uniform, so that local deformation of the plate 5 in which the joint is formed is suppressed during the cold working in the cold working step S4 that becomes a post-step, and it is possible to uniformly impart strain.

Next, changes in the grain size of the joint 7 resulting from changes in the annealing temperature in the anneal heat treatment step S3 will be described with reference to FIGS. 4 and 5. The size of the grain size of the aluminum alloy in the joint 7 varies depending on the annealing temperature of the anneal heat treatment step S3. An item on the left side of FIG. 4 is the annealing temperature, an item on the right side of FIG. 4 is an occurrence situation of enlargement in which the grain size becomes large. Here, the joint 7 formed when the annealing temperature illustrated in FIG. 4 is 413° C. becomes P1 illustrated in FIG. 5. Additionally, the joint 7 formed when the annealing temperature illustrated in FIG. 4 is 393° C. becomes P2 illustrated in FIG. 5. Moreover, the joint 7 formed when the annealing temperature illustrated in FIG. 4 is 373° C. becomes P3 illustrated in FIG. 5. Also, the joint 7 formed when the annealing temperature illustrated in FIG. 4 is 353° C. becomes P4 illustrated in FIG. 5.

Here, as described above, since the friction stir temperature of the friction stir welding step S2 is a temperature between 400° C. to 550° C., the annealing temperature in P1 is higher than a lower limit of the friction stir temperature. Additionally, the annealing temperature in P2 is slightly lower than the friction stir temperature. Moreover, the annealing temperature in P3 is lower than the friction stir temperature and is lower than the annealing temperature of P2. Also, the annealing temperature in P4 is lower than the friction stir temperature and is lower than the annealing temperature of P3.

As illustrated in FIG. 5, in the joint 7 of P1, the enlargement of the grains occurs in a region Ea at the center of the joint in its thickness direction and is as illustrated in FIG. 4. Additionally, in the joint 7 of P2, the enlargement of the grains slightly decreases compared to than P1 at the center of the joint in its thickness direction and is as illustrated in FIG. 4. Moreover, in the joints 7 of P3 and P4, the enlargement of the grains does not occur and is as illustrated in FIG. 4.

As described above, in the anneal heat treatment step S3, it is confirmed that the enlargement of the grains of the joint 7 can be suppressed by setting the annealing temperature so as to become lower than the friction stir temperature of the joint in the friction stir welding step S2. For this reason, in the anneal heat treatment step S3, the plate 5 in which the joint 7 is formed is annealed at an annealing temperature lower than the friction stir temperature. Specifically, in a case where the lower limit temperature of the friction stir temperature is 400° C., it is preferable that the annealing temperature is lower than 400° C. Moreover, the enlargement of the grains of the joint 7 can be more suitably suppressed by making the annealing temperature 10° C. or more lower than the lower limit temperature of the friction stir temperature. On the other hand, if the annealing temperature is made too low, annealing time taken in order to make the hardness of the plate 5 uniform becomes long. Therefore, it is preferable that the annealing temperature is equal to or higher than 350° C.

In the cold working step S4, the cold working is performed in a cold state on the joint 7 after the anneal heat treatment, under predetermined cold working conditions. Here, the cold working conditions are conditions such that the grain size of the joint is equal to or smaller than the grain size of the aluminum alloy in the groove 6 before the friction stir welding step S2. Specifically, in the cold working step S4, a predetermined strain amount is given to the joint 7 by performing the cold working such that the thickness of the joint 7 becomes small.

In the solution heat treatment step S5, solution heat treatment of the plate 5 including the joint 7 after the cold working is performed. In the solution heat treatment step S5, the diameter of the grains formed in the joint 7 varies depending on the cold working conditions in the cold working step S4.

Next, the grain size that varies according to the strain amount given to the joint 7 after the cold working step S4 and the solution heat treatment step S5 will be described with reference to FIGS. 6 and 7. On the graph of FIG. 6, a horizontal axis represents the strain amount, and a vertical axis represents the grain size. The strain amount is the deformation amount of the joint 7 before and after the cold working, for example, a ratio when the thickness of the joint 7 after the cold working becomes small, with respect to the thickness of the joint 7 before the cold working. Additionally, on the graph of FIG. 6, the grain size of the groove 6 and a base material part before the friction stir welding is within a range of a region R.

As illustrated in FIG. 6, the grain size in the region R is between about 0.1 mm to about 0.15 mm. In the cold working step S4, if a strain amount of 0% resulting from the cold working is given to the joint 7 (that is, the cold working is not performed), the grain size of the joint 7 reaches about 0.35 mm. For this reason, in a case where the strain amount is 0%, the grain size of the joint 7 becomes greater than the grain size of the region R. Thus, the grains (structure) of the joint 7 after the solution heat treatment are enlarged. On the other hand, in the cold working step S4, if a strain amount of 5% resulting from the cold working is given to the joint 7, the grain size of the joint 7 reaches about 0.15 mm. For this reason, in a case where the strain amount is 5%, the grain size of the joint 7 becomes the grain size within a range of the region R. Thus, the enlargement of the grains in the joint 7 after the solution heat treatment is suppressed. Moreover, in the cold working step S4, if a strain amount of 10% or more resulting from the cold working is given to the joint 7, the grain size of the joint 7 becomes smaller than 0.1 mm. For this reason, in a case where the strain amount is 10% or more, the grain size of the joint 7 becomes smaller than the grain size of the region R, the grains in the joint 7 after the solution heat treatment are made fine.

Here, FIG. 7 is a view illustrating the joint 7 when the solution heat treatment is performed after the cold working is performed on a test piece W in which the joint 7 is formed by rolling under the cold working conditions such that the predetermined strain amount is obtained. Specifically, the joint 7 when a strain amount of 0% is given thereto becomes P11 illustrated in FIG. 7, the joint 7 when a strain amount of 5% is given thereto becomes P12 illustrated in FIG. 7, and the joint 7 when a strain amount of 10% is given thereto becomes P13 illustrated in FIG. 7. As illustrated in FIG. 7, in a case where the strain amount is 0%, the enlargement of the structure is recognized. On the other hand, in a case where the strain amount is 5%, the enlargement of the structure is no longer recognized. As a result, it is confirmed that, in a case where the strain amount is 10%, the structure of the base material part is also made fine, and a difference between the joint 7 and the other portions is almost eliminated.

As described above, in the cold working step S4, it is confirmed that the enlargement of the grains of the joint 7 can be suppressed by performing the cold working on the joint 7 under the cold working conditions such that the strain amount becomes equal to or more than 5%. For this reason, in the cold working step S4, the cold working is performed on the joint 7 under the cold working conditions such that the strain amount becomes equal to or more than 5%. In addition, by setting the strain amount to be equal to or more than 10%, the structure also including the base material part becomes fine and becomes uniform, and a difference between the joint 7 and the base material part is no longer recognized.

In the aging heat treatment step S6, the hardness of the plate 5 is enhanced by performing artificial aging heat treatment on the plate 5 after the solution heat treatment. For this reason, the plate 5 after the aging heat treatment step S6 becomes T6 having the quality of the aluminum alloy defined by Japanese Industrial Standard (JIS). Here, in the 2219 aluminum alloy material, the elongation amount of the material in the state of T6 is about 4% in a case where strain is not given, whereas an elongation of 8% or more is obtained in a case where a strain of 5% or larger at which the enlargement can be suppressed is given. A desired value at the standard value (AMS-QQ-A-250/30) of this material is equal to or more than 7%, and the standard value can be satisfied by giving strain before the solution heat treatment.

Figure 8:
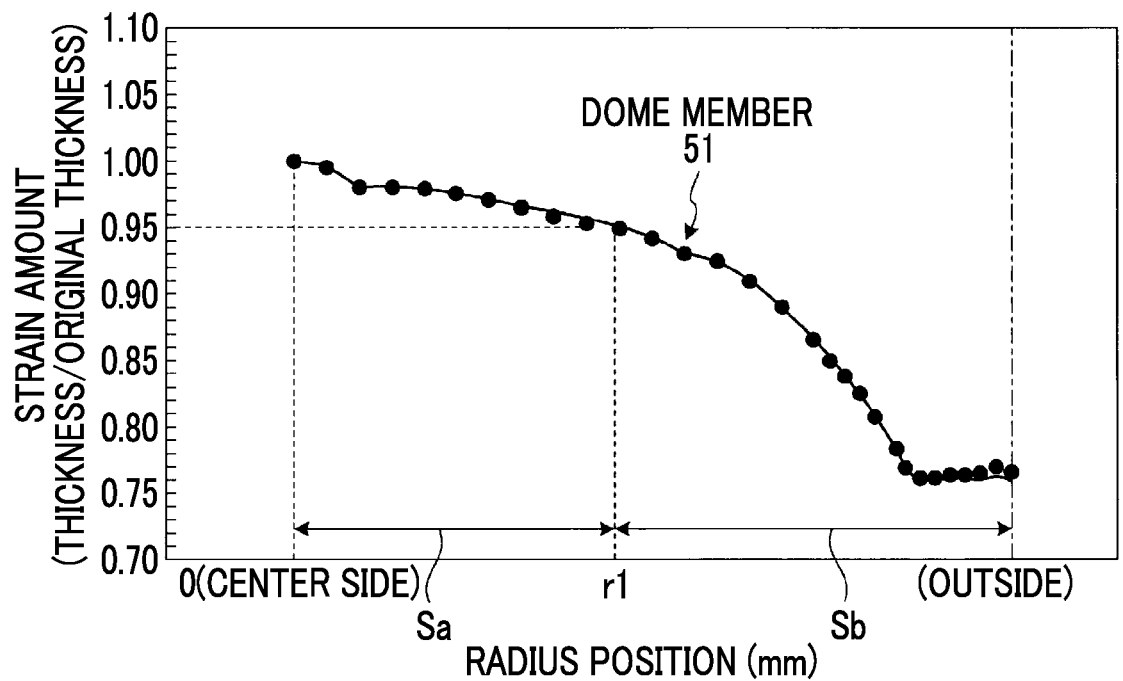
FIG. 8 is a graph regarding the strain amount (plate thickness change) of a dome member to which a joint processing method is applied.
Figure 9:
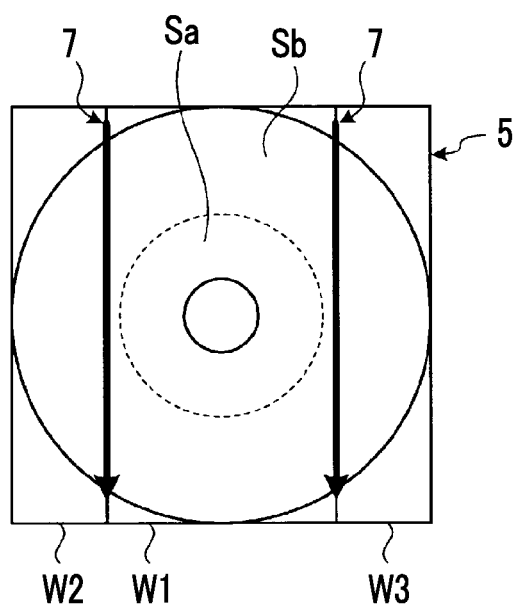
FIG. 9 is a plan view illustrating an example of a plate that becomes a material of the dome member placed in a material placement step.
Figure 10:
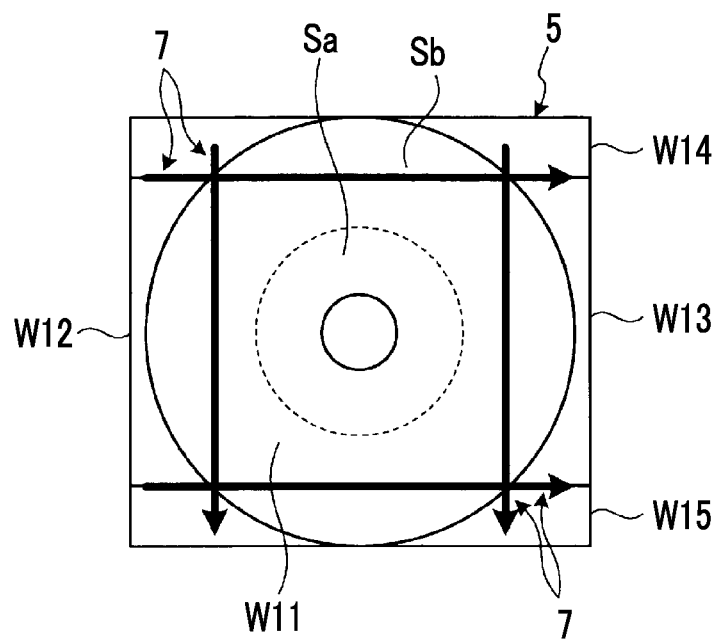
FIG. 10 is a plan view illustrating the example of the plate that becomes the material of the dome member placed in the material placement step.
Figure 11:
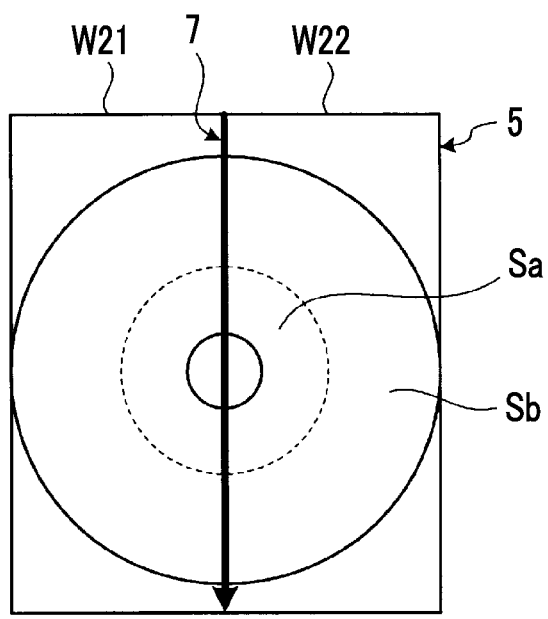
FIG. 11 is a plan view illustrating a related-art example of a plate that becomes a material of a dome member.

Next, a dome member 51 on which the joint processing method of Embodiment 1 is performed will be described with reference to FIGS. 8 to 11. FIG. 8 is a graph regarding the strain amount (plate thickness change) of the dome member to which the joint processing method is applied. FIGS. 9 and 10 are plan views illustrating the example of a plate that becomes a material of the dome member placed in the material placement step. FIG. 11 is a plan view illustrating a related-art example of a plate that becomes a material of a dome member.

As illustrated in FIG. 8, the dome member 51 is formed in the cold working step S4 of the joint processing method. That is, the dome member 51 is formed by performing the cold working on the plate 5 before the cold working. In the cold working step S4, the dome-shaped dome member 51 that curves from the center side of the plate 5 toward the outside thereof is formed by performing rotational cold working, so-called, spinning processing on the plate 5.

In FIG. 8, the horizontal axis represents the position (radial position) of the dome member 51 in its radial direction and the vertical axis represents the strain amount. In addition, the strain amount becomes a ratio of the thickness after the cold working to the thickness before the cold working. Thus, in a case where the thickness before and after the cold working does not vary, a numerical value of the ratio is 1.00 and the strain amount becomes 0%. In the dome member 51 to which the rotational cold working is performed, the strain amount becomes large from the center side of the dome member toward the outside thereof, and the strain amount becomes 5% at a position where the radial position becomes r1. For this reason, in the dome member 51, a region Sa from the center side of the dome member to the radial position r1 is a region where the strain amount becomes smaller than 5%, and a region Sb from the radial position r1 to the outside is a region where the strain amount becomes equal to or more than 5%.

FIGS. 9 and 10 illustrate the plate 5 before the cold working to be subjected to the friction stir welding. As illustrated in FIGS. 9 and 10, in the plate 5, a region corresponding to the region Sa of the dome member 51 is formed on the center side, and a region corresponding to the region Sb of the dome member 51 is formed on the outside of the region Sa. Also, the joint 7 formed in the plate 5 is formed in the region Sb.

For example, in FIG. 9, in a case where the joint 7 is formed in the region Sb, the plate 5 is configured using three workpieces W1 to W3. Specifically, a workpiece W1 among the three workpieces W1 to W3 has a size such that the region Sa falls therein, and this workpiece W1 is disposed at the center. The two remaining workpieces W2 and W3 are disposed on both sides of the workpiece W1, and accordingly, grooves 6 are respectively formed on both sides of the workpiece W1. In the friction stir welding step S2, the plate 5 in which joints 7 are formed in the region Sb by performing the friction stir welding on the two grooves 6 formed in both sides of the workpiece W1, respectively, can be obtained.

Additionally, for example, in FIG. 10, in a case where joints 7 are formed in the region Sb, the plate 5 is configured using five workpieces W11 to W15. Specifically, a workpiece W11 among the five workpieces W11 to W15 has a size such that the region Sa falls therein, and this workpiece W11 is disposed at the center. The four remaining workpieces W12 to W15 are disposed around the workpiece W11, and accordingly, grooves 6 are respectively formed around of the workpiece W11. In the friction stir welding step S2, the plate 5 in which the joints 7 are formed in the region Sb by performing the friction stir welding on the four grooves 6 formed around the workpiece W11, respectively, can be obtained.

Here, in the case of the arrangement of the workpieces W1 to W3 illustrated in FIG. 9, and the arrangement of the workpieces W11 to W15 illustrated in FIG. 10, a welding start point and a welding end point in the friction stir welding step S2 can be located in a region outside the dome member 51 formed during the spinning processing. For this reason, one side of the plate 5 having a rectangular shape can be made to have almost the same length as the diameter of the dome member 51.

In contrast, the plate 5 illustrated in FIG. 11 is disposed by butting two workpieces W21 and W22 with the same size against each other at the center of the plate 5. In this case, since a groove 6 passes through the center of the plate 5, the joint 7 formed in the friction stir welding step S2 is formed in the region Sa. Hence, since the joint formed in the region Sa does not receive strain required for suppressing the enlargement during the spinning processing, the enlargement of the structure cannot be prevented. Additionally, since the welding start point and the welding end point in the friction stir welding step S2 are located in the region outside the dome member 51 formed during the spinning processing, it is necessary to make one side of the plate 5 having a rectangular shape larger than the diameter of the dome member 51. Hence, the plate 5 illustrated in FIG. 11 becomes larger than the plates 5 illustrated in FIGS. 9 and 10.

As described above, according to Embodiment 1, nucleation sites for recrystallization can be increased in the joint 7 by performing the cold working step S4 on the joint 7 of the plate 5 formed in the friction stir welding step S2. For this reason, if the solution heat treatment step S5 is performed after the cold working step S4, the growths of the nucleation sites for recrystallization can be suppressed each other by an amount equivalent to an increase in the nucleation sites for recrystallization. Therefore, the enlargement of the grains of the joint 7 can be suppressed, and the grains of the joint 7 can be made fine. In this way, a decrease in the quality of the joint 7 can be suppressed by making the grains of the joint 7 fine. Therefore, for example, even in a case where strain is imparted after the solution heat treatment in order to enhance the strength of the plate 5, it is possible to obtains quality capable of withstanding the cold working.

Additionally, according to Embodiment 1, the enlargement of the grains of the joint 7 can be suitably suppressed by setting the cold working conditions to the conditions such that the strain amount of the joint before and after the cold working step S4 becomes equal to or more than 5%.

Additionally, according to Embodiment 1, the anneal heat treatment step S3 is performed, so that the hardness in the joint 7 of the plate 5 can be made uniform, and in the cold working step S4, the local deformation of the plate 5 can be suppressed, and strain can be uniformly imparted.

Additionally, according to Embodiment 1, the enlargement of the grains in the joint 7 can be suppressed by making the friction stir temperature high and making the annealing temperature low, in the anneal heat treatment step S3.

Additionally, according to Embodiment 1, the friction stir welding can be performed from both sides of the groove 6, and the first stirring region formed by the first rotation tool 21 and the second stirring region formed by the second rotation tool 22 can be overlapped with each other. For this reason, since the friction stirring can be performed over the entire region in the thickness direction of the joint 7, heat input to the joint 7 resulting from the friction stirring can be performed over the entire region in the thickness direction.

Additionally, according to Embodiment 1, the hardness of the plate 5 can be enhanced by performing the aging heat treatment step S6 after the cold working step S4 is formed in the cold state and the solution heat treatment step S5 is performed. Hence, T6 having the quality of the aluminum alloy defined by Japanese Industrial Standard (JIS) even in a case where the joint 7 is formed in the plate 5 can be obtained.

Additionally, according to Embodiment 1, the plate 5 can be formed in the dome member 51 while giving strain to the plate 5 by performing the rotational cold working in the cold working step S4. Therefore, the plate 5 can be worked in a dome shape while suppressing the enlargement of the grains.

Additionally according to Embodiment 1, the cold working step S4 can be performed in the cold state. Therefore, the cold working to the joint 7 can be appropriately performed while appropriately controlling the strain amount to be given to the joint 7. Additionally, in a case where temperature is equal to or lower than 100° C., a recovery phenomenon or the like does not occur. Therefore, a phenomenon in which the strain put in during the cold working is got rid of during working also does not occur, and the amount of the nucleation sites for recrystallization for suppressing the enlargement can also be controlled.

In addition, in Embodiment 1, the anneal heat treatment step S3 is provided. However, in a case where the hardness of the joint 7 after the friction stir welding step S2 becomes uniform or in a case where a harness difference hardness does not have a bad influence on the cold working step S4, the anneal heat treatment step S3 may be skipped.

Additionally, in Embodiment 1, in the anneal heat treatment step S3, the annealing temperature is made lower than the friction stir temperature. In this case, however, the friction stir temperature may be made high during the friction stir welding, the annealing temperature may be made low during the anneal heat treatment step, or both may be performed. The invention is not particularly limited. For this reason, for example, in the friction stir welding step S2, a heating source that heats the groove 6 may be provided on the back side of a welding tool in the thickness direction of the groove 6. According to this configuration, in the friction stir welding step S2, the friction stir temperature of the joint 7 can be made high by heating the joint 7 with the heating source. For this reason, in a case where the anneal heat treatment step S3 is performed, the annealing temperature can be set to be high. Therefore, the annealing time can be shortened, and working efficiency can be enhanced.

Embodiment 2

Figure 12:
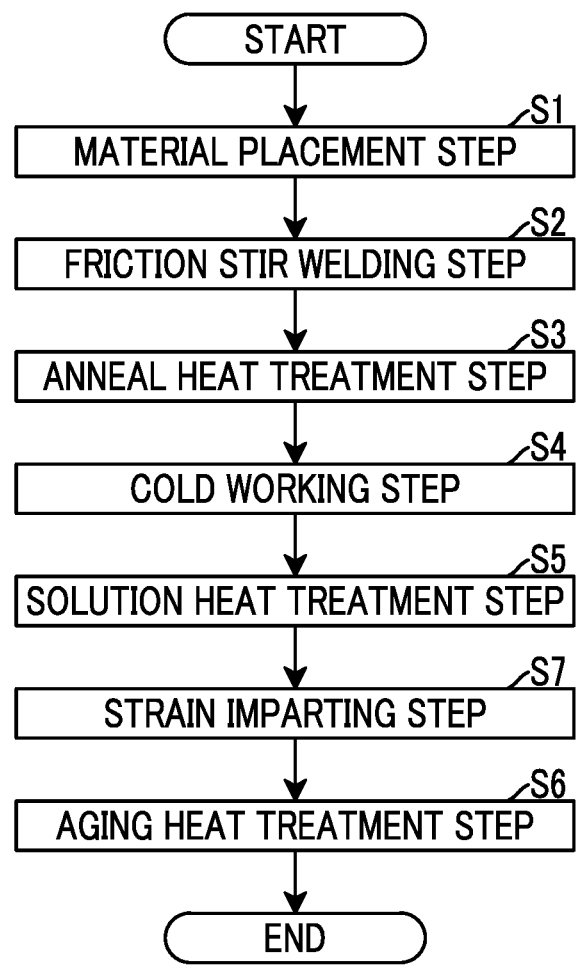
FIG. 12 is a flowchart regarding a joint processing method related to Embodiment.

Next, a joint processing method related to Embodiment 2 will be described with reference to FIG. 12. FIG. 12 is a flowchart regarding the joint processing method related to Embodiment 2. In addition, in Embodiment 2, portions different from Embodiment 1 will be described in order to avoid duplicate description, and portions having the same configurations as Embodiment 1 will be designated by the same reference signs. In the joint processing method related to Embodiment 2, a strain imparting step S7 is performed after the solution heat treatment between the solution heat treatment step S5 and the aging heat treatment step S6 of the joint processing method of Embodiment 1. Hereinafter, the joint processing method related to Embodiment 2 will be described.

As illustrated in FIG. 12, in the joint processing method related to Embodiment 2, the strain imparting step S7 is performed before the aging heat treatment step S6 after the solution heat treatment step S5. In the strain imparting step S7, the strength of the plate 5 is improved by performing the cold working in the cold state on the plate 5 after the solution heat treatment. In addition, the strain amount to be given to the plate 5 in the strain imparting step S7 is within a range of 2% to 8%, and higher strength is obtained after the aging heat treatment as the strain amount is larger.

As described above, according to Embodiment 2, the strength of the plate 5 can be enhanced by further performing the strain imparting step S7 in the cold state and performing the aging heat treatment step S6 after the cold working step S4 is performed in the cold state and the solution heat treatment step S5 is performed. Hence, T8 having the quality of the aluminum alloy defined by Japanese Industrial Standard (JIS) even in a case where the joint 7 is formed in the plate 5 can be obtained. This is because, since the grains in the joint 7 after the solution heat treatment are not enlarged, the joint 7 has quality capable of withstanding processing even in a case where impartment of higher strain is performed.

Embodiment 3

Figure 13:
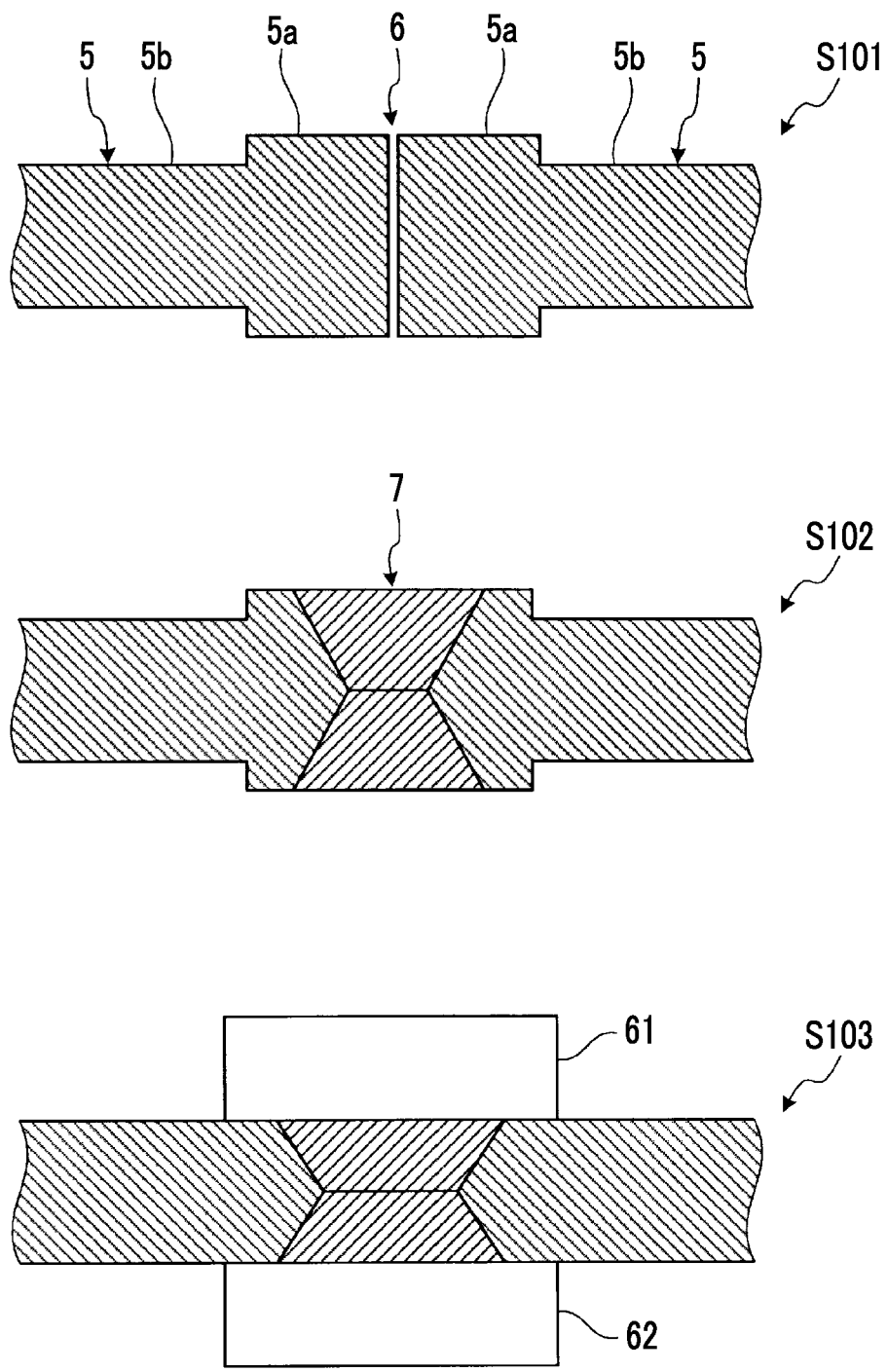
FIG. 13 is an explanatory view illustrating a joint processing method related to Embodiment 3.

Next, a joint processing method related to Embodiment 3 will be described with reference to FIG. 13. FIG. 13 is an explanatory view illustrating the joint processing method related to Embodiment 3. In addition, also in Embodiment 3, portions different from Embodiments 1 and 2 will be described in order to avoid duplicate description, and portions having the same configurations as Embodiments 1 and 2 will be designated by the same reference signs. In the joint processing method related to Embodiment 3, the thickness of the joint 7 is made larger than the thickness of regions other than the joint. Hereinafter, the joint processing method related to Embodiment 3 will be described.

As illustrated in FIG. 13, in the joint processing method related to Embodiment 3, in a plate 5 to be placed the material placement step S1, the thickens of an end part 5a that faces another plate 5 to be butted against the plate 5 is made large (S101). Meanwhile, the thickness of a part 5b other than the end part 5a is made smaller than the thickness of the end part 5a.

In the friction stir welding step S2, the joint 7 is formed by performing the friction stir welding on the groove 6 formed by the end part 5a of one plate 5 and the end part 5a of the other plate 5, from both sides in the thickness direction of the groove 6, using the first rotation tool 21 and the second rotation tool 22 (S102). The thickness of the joint 7 formed by the friction stir welding step S2 becomes larger than the thickness of portions other than the joint 7.

Then, in the cold working step S4, the joint 7 is subjected to the cold working such that the thickness of the joint 7 becomes small, by performing press forming using an upper die 61 and a lower die 62 from both sides in the thickness direction (S103).

As described above, according to Embodiment 3, in the cold working step S4, the cold working is performed such that the thickness of the joint 7 becomes small. Accordingly, the thickness of the joint 7 and the thickness of regions other than the joint 7 can be made to be the same thickness while suppressing the enlargement of the grains in the joint 7.

In addition, in Embodiment 3, as the cold working step S4, a forging step may be performed. In this case, by giving pressure to the joint 7 two or more times using a hammer or the like, the cold working may be performed such that a dead metal region is not formed.

REFERENCE SIGNS LIST

1: FRICTION STIR WELDING DEVICE
5: PLATE
6: GROOVE
7: JOINT
21: FIRST ROTATION TOOL
22: SECOND ROTATION TOOL
32: FIRST PROBE
35: FIRST SHOULDER PART
42: SECOND PROBE
45 SECOND SHOULDER PART
51: DOME MEMBER
I1: FIRST ROTATING AXIS
I2: SECOND ROTATING AXIS

The invention claimed is:

1. A joint processing method comprising:
   a friction stir welding step of forming a joint in a metal material by performing friction stir welding on a part to be welded, of the metal material;
   a cold working step of performing cold working on the joint under cold working conditions such that a grain size of the joint is equal to or smaller than a grain size of metal in the part to be welded before the friction stir welding step; and
   a solution heat treatment step of, subsequent to the cold working step, performing solution heat treatment of the metal material,
   wherein the cold working conditions are conditions such that a strain amount of the joint given in the cold working step becomes equal to or more than 5%,
   wherein the metal material in which the joint is formed in the friction stir welding step is a plate material having a plate shape,
   wherein, in the cold working step, rotational cold working is performed on the plate material so as to provide a dome shape that curves from a center of the plate material toward an outside of the plate material and a dome member is formed,
   wherein a strain amount such that a thickness of the plate material becomes smaller is given from the center of the plate material toward the outside of the plate material,
   wherein the strain amount being defined as a ratio of the thickness of the plate material after the rotational cold working to the thickness of the plate material before the rotational cold working,
   wherein the dome member comprises a first region exhibiting a strain amount of less than 5% and extending from a center of the dome member to a radial position of the dome member, and a second region exhibiting a strain amount of equal to or more than 5% and extending from the radial position of the dome member to the outside of the dome member, the strain amount at the radial position of the dome member being 5%, and
   wherein the joint formed in the plate material is formed in the second region.

2. The joint processing method according to claim 1, further comprising:
   an anneal heat treatment step of performing anneal heat treatment on the metal material including the joint after the friction stir welding step and before the cold working step.

3. The joint processing method according to claim 2,
   wherein a friction stir temperature of the joint in the friction stir welding step is made higher than an annealing temperature of the joint in the anneal heat treatment step.

4. The joint processing method according to claim 1,
   wherein, in the friction stir welding step, friction stir welding is performed from both sides in a thickness direction of the part to be welded such that a first stirring region formed on a first side in the thickness direction of the part to be welded and a second stirring region formed on a second side in the thickness direction of the part to be welded overlap each other.

5. The joint processing method according to claim 1, wherein, in the friction stir welding step, a heating source that heats the part to be welded is provided opposite to a welding tool in a thickness direction of the part to be welded.

6. The joint processing method according to claim 1, further comprising:
an aging heat treatment step of performing aging heat treatment on the metal material including the joint after the solution heat treatment step.

7. The joint processing method according to claim 1, further comprising:
a strain imparting step of performing cold working on the metal material including the joint for improving a strength of the metal material, after the solution heat treatment step; and
an aging heat treatment step of performing aging heat treatment on the metal material including the joint after the strain imparting step.

8. The joint processing method according to claim 1, wherein the thickness of the metal material in the joint is made to be greater than the thickness of the metal material in parts other than the joint, and
wherein, in the cold working step, cold working is performed such that the thickness of the joint becomes smaller than the thickness of the joint formed in the friction stir welding step.

9. The joint processing method according to claim 1, wherein the metal material is an aluminum alloy.

10. The joint processing method according to claim 1, wherein the cold working step is performed in a cold state.

11. A dome member formed in a dome shape by performing rotational cold working on a plate-shaped metal material in which a joint is formed by friction stir welding, wherein:
during the rotational cold working, the plate-shaped metal material is formed in a dome shape that curves from a center of the plate-shaped metal material toward an outside of the plate-shaped metal material while a strain amount such that a thickness of the plate-shaped metal material becomes smaller is given from a center of the dome member toward an outside of the dome member,
the dome member comprises a first region exhibiting a strain amount of less than 5% and extending from the center of the dome member to a radial position of the dome member, and a second region exhibiting a strain amount of equal to or more than 5% and extending from the radial position of the dome member to the outside of the dome member, the strain amount at the radial position of the dome member being 5% and the strain amount being defined as a ratio of the thickness of the plate-shaped metal material after the rotational cold working to the thickness of the plate-shaped metal material before the rotational cold working, and
the joint formed in the plate-shaped metal material is formed in the second region.

12. A joint processing method comprising:
a friction stir welding step of forming a joint in a metal material by performing friction stir welding on a part to be welded, of the metal material;
a cold working step of performing cold working on the joint under cold working conditions such that a grain size of the joint is equal to or smaller than a grain size of metal in the part to be welded before the friction stir welding step; and
a solution heat treatment step of, subsequent to the cold working step, performing solution heat treatment of the metal material,
wherein the cold working conditions are conditions such that a strain amount of the joint given in the cold working step becomes equal to or more than 5%,
wherein, in the friction stir welding step, friction stir welding is performed simultaneously from both sides in a thickness direction of the part to be welded such that a first stirring region formed, by a first probe of a first rotation tool, on a first side in the thickness direction of the part to be welded and a second stirring region formed, by a second probe of a second rotation tool, on a second side in the thickness direction of the part to be welded overlap each other, and
wherein the first probe and the second probe are longer than half of a thickness of the part to be welded, and the first rotation tool and the second rotation tool are disposed in an offset manner so as not to interfere with each other physically.

13. The joint processing method according to claim 1, wherein:
a longitudinal direction is a direction in which the joint extends, and a width direction is a direction which is orthogonal to the longitudinal direction,
in the friction stir welding step, a second workpiece is arranged on a first side of a first workpiece in the width direction, and a third workpiece is arranged on a second side of the first workpiece in the width direction, the first workpiece includes all of the first region, and each of the second workpiece and the third workpiece includes a part of the second region, and
the friction stir welding step joins the first workpiece and the second workpiece and joins the first workpiece and the third workpiece by friction stir welding in the longitudinal direction.

14. The joint processing method according to claim 1, wherein:
a longitudinal direction is a direction which the joint extends, and a width direction is a direction which is orthogonal to the longitudinal direction,
in the friction stir welding step, a second workpiece and a third workpiece are arranged on respective sides of a first workpiece in the width direction, and a fourth workpiece and a fifth workpiece are arranged on respective sides of the first workpiece in the longitudinal direction, the first workpiece includes all of the first region, and each of the second workpiece, the third workpiece, the fourth workpiece and the fifth workpiece includes a part of the second region, and
the friction stir welding step joins the first workpiece, the second workpiece and the third workpiece in the longitudinal direction, and joins the first workpiece, the fourth workpiece and the fifth workpiece in the width direction, by friction stir welding.

* * * * *